United States Patent [19]

Friedlander et al.

[11] 4,187,366
[45] Feb. 5, 1980

[54] AMIDE-MODIFIED URETHANE ACRYLATE RADIATION CURABLE COMPOUNDS DERIVED FROM CONDENSATION REACTION PRODUCTS OF CARBOXYL AND ISOCYANATO GROUPS

[75] Inventors: Charles B. Friedlander, Glenshaw; John C. McMullen, Pittsburgh, both of Pa.

[73] Assignee: PPG Industries, Inc., Pittsburgh, Pa.

[21] Appl. No.: 891,426

[22] Filed: Mar. 28, 1978

[51] Int. Cl.² ............... C08G 18/34; C08G 18/32; C08G 18/62
[52] U.S. Cl. .......................... 528/75; 528/49
[58] Field of Search ............ 260/77.5 R, 77.5 AM, 260/77.5 CR, 859 R; 528/75, 49

[56] References Cited

U.S. PATENT DOCUMENTS

| | | | |
|---|---|---|---|
| 3,179,625 | 4/1965 | Ehrhart | 260/77.5 SS |
| 3,367,992 | 2/1968 | Bearden | 260/837 |
| 3,700,643 | 10/1972 | Smith et al. | 260/77.5 AN |

*Primary Examiner*—H.S. Cockeram
*Attorney, Agent, or Firm*—George D. Morris; J. Timothy Keane

[57] ABSTRACT

Radiation curable compounds are disclosed comprising an amide moiety, a urethane moiety and an ethylenically unsaturated functional group, typically an acrylate functional group. This class of amide urethane acrylate compounds is characterized in having an amide moiety formed by the condensation reaction between a compound containing one or more carboxylic acid groups and an isocyanato-containing compound. Coating compositions containing one or more of these amide urethane acrylate compounds radiation polymerize at relatively high rates to provide protective and decorative films having improved wear resistance and flexibility.

27 Claims, No Drawings

AMIDE-MODIFIED URETHANE ACRYLATE RADIATION CURABLE COMPOUNDS DERIVED FROM CONDENSATION REACTION PRODUCTS OF CARBOXYL AND ISOCYANATO GROUPS

BACKGROUND OF THE INVENTION

1. Field of the Invention

Radiation sensitive compounds which addition polymerize rapidly in the presence of actinic or ionizing radiation are of interest for use in film-forming compositions. Of particular interest are fast-curing compounds which provide elastomeric and wearlayer films having improved durability and flexibility.

2. Description of the Prior Art

Film-forming compositions containing radiation curable components are well-known. Films formed from compounds having urethane moieties and acrylate functional groups are recognized to possess very good wear and weather resistance properties and also have good flexural strength properties. Typical of these urethane-acrylate radiation-curable film-forming materials are the compositions disclosed in U.S. Pat. No. 3,509,234 to Burlant et al and No. 4,038,257 to Suzuki et al. Although these urethane acrylate compositions have gained widespread acceptance for forming protective and decorative films on a variety of substrates, there is ever increasing demand for compositions which cure quickly to form tough, flexible films. The advantages of shorter curing times include productivity increases coupled with potential savings in energy consumption. Moreover, a composition which cures quickly after application to a substrate is likely to form a cured coating of higher gloss and smoothness inasmuch as the wet film is exposed for a lesser period of time to contamination from dust-laden environments typically attending coating operations.

Coating compositions containing very fast curing components have been devised. For example, copending U.S. application Ser. No. 821,856, filed Aug. 7, 1977, of G. W. Gruber, discloses coating compositions containing amide moieties and acrylate functional groups that can form very hard films on coated substrates passing under a curing radiation source at about 350 feet per minute. These amide acrylate compounds do not, however, provide cured films having particularly good flexural strength properties.

Fast-curing compositions for forming tough, flexible protective or decorative films would be quite useful for coating floor tile, vinyl overlays used in covering furniture and other articles, and various other flexible substrates. Baseboard coving, for example, is typically made of rubber or flexible plastic materials which require protective films of good flexibility since the coving materials are frequently shipped in rolls and are folded or bent during application to a wall base. Vinyl overlay coverings, often only two to ten thousandths of an inch in thickness, are frequently used to cover furniture and other articles having sharp-angled surface configurations. Protective films for these vinyl coverings must have sufficient flexural and tensile strength properties to withstand folding and creasing without the film cracking, tearing or lifting from the vinyl substrate.

A class of addition polymerizable or radiation-curable compounds characterized in having a molecule comprising amide and urethane moieties, and an ethylenically unsaturated functional group such as an acrylate functional group, is disclosed in copending U.S. Application Ser. No. 890,895 of C. B. Friedlander et al, filed on even date herewith, now U.S. Pat. No. 4,153,776, issued May 8, 1979. This class of addition polymerizable amide urethane acrylate compounds comprises the addition reaction products of an amide compound containing at least one hydroxy functional group, a polyisocyanate and a polyfunctional compound containing at least one hydroxy functional group reactive with an isocyanato group of the polyisocyanate and which polyfunctional compound provides at least one ethylenically unsaturated functional group in the reaction product.

Films formed from compounds of the aforementioned class of amide urethane acrylate compounds possess improved abrasion resistance and tensile strength as compared to films made from urethane acrylate compounds; moreover, compositions containing the amide urethane acrylate compounds addition polymerize in the presence of radiation relatively quickly. This combination of properties makes amide urethane acrylate compounds especially useful as radiation-curable coatings for floor tile and wall-base coving.

SUMMARY OF THE INVENTION

Another class of addition polymerizable, radiation-curable amide urethane acrylate compounds has been found that provides films having very good abrasion resistance and flexural strength properties. An addition polymerizable compound of this new class is characterized by a molecular structure comprising at least one amide moiety, at least one urethane moiety and at least one ethylenically unsaturated functional group, and is the reaction product of (a) a carboxylic acid containing at least one carboxyl functional group, (b) a polyisocyanate, and (c) a polyfunctional compound containing at least one hydroxy functional group which is reactive with an isocyanato group of the polyisocyanate to provide at least one urethane group in the reaction product and which polyfunctional compound provides at least one ethylenically unsaturated functional group in the reaction product.

In addition to having improved physical strength properties, films formed from compositions having one or more of the described radiation polymerizable compounds generally exhibit good elongation properties. Moreover, this class of amide urethane acrylate compounds provides coating compositions that are relatively fast curing in the presence of actinic light or ionizing radiation.

DESCRIPTION OF THE PREFERRED EMBODIMENTS

The addition polymerizable radiation sensitive compound derived from the reaction of an organic acid such as a carboxylic acid containing at least one carboxyl functional group, a polyisocyanate and the described polyfunctional compound may be generally characterized as an amide urethane acrylate reaction product in that the product is characterized in having a molecule comprising amide and urethane moieties and an ethylenically unsaturated group, typically an acrylate functional group. In the presence of actinic light or ionizing radiation, the ethylenic groups of the molecules cross-link relatively quickly to form durable, abrasion-resistant films built from a network of molecular units containing the amide and urethane moieties. A reaction product of this class of amide urethane acrylate compounds is characterized in having an amide moiety introduced into the molecular structure of the compound by a condensation or addition-elimination reaction between a carboxyl functional group of a carboxylic acid and an isocyanato group, according to the mechanism theorized in equation I:

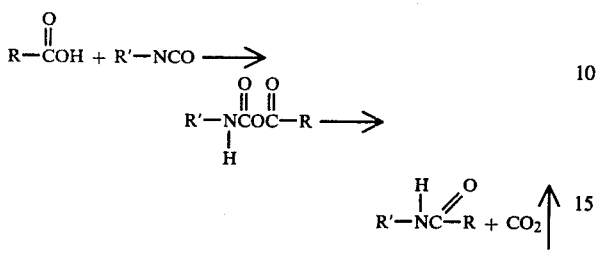

Groups represented by R may comprise the residue of an organic acid, as contributed by mono and polycarboxylic acids. Groups represented by R' may comprise the residue of a polyisocyanate compound and may include the residue of an intermediate formed from the reaction of a polyisocyanate and one of the described polyfunctional compounds. The formation of carbon dioxide gas as a condensation product during formation of the amide moiety is characteristic of reaction products of the amide urethane acrylate compounds of the invention.

Films made from compounds of this class of amide urethane acrylates possess improved abrasion resistance and flexural strength as compared to films made from urethane acrylate compounds. The flexural strength properties associated with prior art urethane acrylate films are believed attributable to the presence of urethane moieties in the molecule of the film-forming compound. Abrasion resistance and increased toughness properties of amide urethane acrylate films are believed attributable to the presence in the film-forming compound of amide moieties. The incorporation of amide groups into a urethane acrylate compound would, perhaps, expectedly increase the hardness of cured films made from the new compound. Unexpected and surprising, however, is the discovery that such amide-modified urethane acrylate films not only possess much-improved abrasion resistance, but that these new compounds provide films having improved elastomeric properties as indicated by significant increases in cured film tensile strength over urethane acrylate films not containing amide groups.

An advantage of this class of amide urethane acrylate compounds derived from condensation reaction of an acid and isocyanato group over the aforementioned class of amide urethane acrylate reaction products disclosed in the aforementioned co-pending application is that compounds of the instant invention provide films that may be less brittle than the films made from the referenced class of compounds.

The combination of improved film physical properties and relatively high rates of film cure provide coating compositions that are especially useful as protective film coatings for floor tile coatings and wall-base covings.

A useful amide urethane acrylate compound of the invention may be monomeric or oligomeric in character, depending upon the types and reactant ratios of the starting materials used to make the reaction product.

A carboxylic acid containing at least one carboxyl functional group which reacts with an isocyanato group to provide an amide moiety in the reaction product may be a saturated monocarboxylic acid or may be a polycarboxylic acid containing two or more carboxyl functional groups, either of the saturated or unsaturated type. Also, the carboxyl group may be furnished by a compound of the class of hydroxy carboxylic acids.

For purposes of the present invention, the aromatic nuclei of aromatic acids such as phthalic acid are generally regarded as saturated since the double bonds do not ordinarily react by addition as do ethylenic groups. Therefore, wherever the term "saturated" is utilized, it is to be understood that such term includes aromatic unsaturation or other form of unsaturation which does not react by addition, unless otherwise qualified.

A suitable monocarboxylic acid may be any organic acid having one carboxyl group attached to either an alkyl group or an aryl group; the organic portion of the acid may be fully saturated or may contain unsaturated groups. The alkyl and aryl groups may be substituted or unsubstituted. Typically suitable monocarboxylic acids include acetic acid, propionic acid, butyric acid, valeric acid, caprylic acid, 2-ethyl hexanoic acid, caproic acid, lauric acid, myristic acid, palmitic acid, stearic acid, oleic acid, linoleic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, salicyclic acid, p-hydroxybenzoic acid, anthranilic acid, o-methoxybenzoic acid, m-methoxybenzoic acid and p-methoxybenzoic acid. Preferred monocarboxylic acid starting materials are acetic acid, propionic acid, 2-ethyl hexanoic acid and benzoic acid.

Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebaccic acid, dodecanedioic acid, phthalic acid, isophthalic acid, terephthalic acid, tetrachlorophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid. Preferred saturated polycarboxylic acids are adipic acid, azelic acid and dodecanedioic acid.

Saturated tricarboxylic acids and saturated acids of higher carboxylic functionality may be used to provide branching where this is desirable.

The ethlenically unsaturated polycarboxylic acids include maleic acid, fumaric acid, aconitic acid, itaconic acid, citraconic acid, mesaconic acid, muconic acid and dihydromuconic acid and halo and alkyl derivatives of such acids. Mixtures of ethylenically unsaturated polycarboxylic acids may be used or only a single such acid may be employed. A preferred unsaturated polycarboxylic acid is fumaric acid.

Suitable hydroxy carboxylic acids include α-hydroxy acids such as hydroxyacetic acid, α-hydroxypropionic acid and α-hydroxyisobutyric acid, β-hydroxy acids such as ethyl β-hydroxybutyric acid, γ-hydroxy acids such as γ-hydroxyvaleric acid, and aromatic hydroxy acids such as mandelic acid. Also suitable is the hydroxy acid prepared from the reaction of phthalic anhydride and diethylene glycol. Preferred hydroxy acids are hydroxyacetic acid and 2,2-bis(hydroxymethyl)propionic acid.

The organic polyisocyanates useful for furnishing an isocyanato functional group to react with an organic acid carboxyl group include ethylene diisocyanate, 1,2-diisocyanatopropane, 1,3-diisocyanatopropane, 1,6-diisocyanatohexane, trimethylhexamethylene diisocyanate, 1,2-diisocyanatocyclohexane, 1,3-diisocyanatocyclohexane, 1,4-diisocyanatocyclohexane, o-diisocyanatobenzene, m-diisocyanatobenzene, p-diisocyanatobenzene, bis-(4-isocyanatocyclohexyl)methane, bis(4-isocyanatophenyl)methane, toluene diisocyanate (which commercially is a mixture comprising about 80 percent 2,4-diisocyanatotoluene and about 20 percent 2,6-diisocyanatotoluene), 3,3'-dichloro-4,4'-diisocyanatobiphenyl, tris(4-isocyanatophenyl)methane, 1,5-diisocyanatonaphthalene, hydrogenated toluene diisocyanate, 1-isocyanatomethyl-5-isocyanato-1,3,3-trimethylcyclohexane, and 1,3,5-tris(6-isocyanatohexyl)biuret. Also included are polyisocyanates in a blocked form such as the bis(phenylcarbamate) of toluene diisocyanate and the bis(phenylcarbamate) of 1,5-diisocyanatonaphthalene.

The third component for making the reaction product of the invention is a polyfunctional compound having at least one functional group which is reactive with an isocyanato group of the aforementioned polyisocyanate compound. It is further required that the polyfunctional compound provide at least one ethylenic functional group in the reaction product. Usually, the functional group of the polyfunctional compound reactive with the isocyanato group is a hydroxyl group, while the ethylenic group is furnished by an acrylate moiety.

Representative examples of these polyfunctional compounds include hydroxy-containing acrylic monomers, such as 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl acrylate, 3-hydroxypropyl methacrylate; and halogenated hydroxyalkyl acrylates such as 3-chloro-2-hydroxypropyl acrylate, 3-chloro-2-hydroxypropyl methacrylate, 3-bromo-2-hydroxypropyl acrylate, 3-bromo-2-hydroxypropyl methacrylate, 2-chloro-1-(hydroxymethyl)ethyl acrylate, 2-chloro-1-(hydroxymethyl)ethyl methacrylate, 2-bromo-1-(hydroxymethyl)ethyl methacrylate.

Other useful polyfunctional compounds include allyl alcohols as a class.

The reaction product of the invention may be derived by using only one of the aforementioned polyfunctional compounds or it may be derived from a mixture of more than one compound. The preferred compounds are the hydroxyalkyl acrylic monomers. Especially preferred are 2-hydroxyethyl acrylate and 2-hydroxypropyl acrylate.

In addition to the three major components required for preparing the radiation polymerizable compound of the invention, there may be additional optional components reactable with the major components to form useful reaction product. A fourth component may be a hydroxyfunctional organic compound, typically a polyol, of low to high molecular weight. The polyol component is useful for modifying the viscosity of the amide urethane acrylate compound by increasing the molecular weight of the reaction product without inhibiting its high cure rate or the physical strength properties of cured films. The polyol generally has a number of hydroxyl functional groups sufficient to react with only a portion of the reactive isocyanato groups of the polyisocyanate to form urethane groups in the reaction product. Thus, the reaction product may contain an amide group attached to the residue from the reaction of an organic acid compound with a polyisocyanate and a urethane group attached to the residue from the reaction of a polyol with a polyisocyanate.

Suitable classes of molecular weight building polyols having two or more hydroxy functional groups are polyester polyols, simple alkyl diols and triols, polyether polyols and polyoxyalkylene polyols.

Examples of polyester polyols are the esterification reaction products of a saturated or unsaturated polycarboxylic acid and an excess of a polyhydric alcohol. Suitable saturated and unsaturated polycarboxylic acids are set forth above as starting materials for introducing an amide moiety into the amide urethane acrylate compounds of the invention.

The polyhydric alcohols useful in preparing polyesters include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methyl-pentane-1,4-diol, 2,2-diethylbutane-1,3-diol, 4,5-nonanediol, diethylene glycol, triethylene glycol, dipropylene glycol, neopentyl glycol, glycerol, pentaerythritol, erythritol, sorbitol, mannitol, 1,1,1-trimethylolpropane, trimethylolethane, and 2,2-dimethyl-3-hydroxypropyl 2,2-dimethyl-3-hydroxypropionate. Ethylenically unsaturated polyhydric alcohols such as 2-butene-1,4-diol may be used alone or in admixture with the saturated polyhydric alcohols. Of course, mixtures of saturated polyhydric alcohols or mixtures of unsaturated polyhydric alcohols may be employed.

In addition to the aforementioned polyhydric alcohols, suitable polyesters may also be formed from reaction of the mentioned dicarboxylic acids with thioether diols such as thiodiethanol or a thioether diol made from reaction of 4,4'-dihydroxydiphenyl sulphide with propylene oxide.

The polyesters derived from reaction of the aforementioned polycarboxylic acids and polyhydric alcohols should have reactive hydroxyl functionality in sterically unhindered positions on the polyester backbone. Often, such hydroxyl functionality is located in terminal positions. This may be achieved by reacting a molar excess of the alcohol with a carboxyl-terminated acid; or the hydroxyl functionality may be introduced by capping the polyester with a di- or higher polyfunctional alcohol which is usually chosen from the aforementioned group of polyhydric alcohols. Other capping compounds for carboxyl-terminated polyesters include epoxides, such as ethylene oxide and propylene oxide, epihalohydrins such as epichlorohydrin and epibromohydrin, and the triglycerides of epoxidized fatty oils such as epoxidized linseed oil, safflower oil and soybean oil.

Preferred polyester polyols made from the reactants described include poly(hexamethylene adipate), poly(1,4-butylene adipate), poly(ethylene phthalate) and poly(ethylene maleate). Another class of preferred polyester polyols includes polycaprolactone polyols made from polymerization of caprolactone with various diols or higher polyols. Especially preferred are those poly(caprolactone) polyols having molecular weights in the range of about 500 to 900 and hydroxy values of about 180 to 220.

Examples of useful simple alkyl diols and triols as molecular weight building components are the polyhydric alcohols set forth above for preparation of the polyester polyols. Useful polyether polyols are those prepared from the polymerization of aldehydes, alkylene oxides or glycols by known methods. For example, formaldehyde, ethylene oxide, propylene oxide, epichlorohydrin and the like may addition polymerize to form polyether diols under appropriate conditions. Preferred polyether polyols include the class comprising polyalkyleneoxide polyols. Especially preferred are polypropylene glycol, polyethylene glycol and polybutylene glycol.

The amide urethane acrylate compound of the invention may be generally prepared by mixing together one or more of each of the aforementioned carboxylic acids, polyisocyanates and polyfunctional compounds and allowing the mixture to react for a period of time sufficient to form the reaction product. Or, an organic acid compound and a polyisocyanate may be reacted to form an amide intermediate having at least one terminal isocyanato group; then the intermediate is reacted with the polyfunctional compound. Or, the polyisocyanate may be reacted with the polyfunctional compound to form a urethane-acrylate intermediate containing at least one terminal isocyanato group; then the intermediate is reacted with an organic acid to form the reaction product. Preferably, the reaction product is formed by firstly preparing an isocyanato-terminated amide intermediate, and then adding the polyfunctional compound gradually to the amide intermediate to form an amide urethane acrylate.

Whether all the components are mixed together at once or the components are added together to form intermediates, the equivalent weight ratios of organic acid to polyisocyanate to polyfunctional compound are generally in the range of 1:1.25:0.25 to 1:2:1, and more usually the range of equivalent weight ratios is 1:1.5:0.65 to 1:2:1, although significantly lower amounts of the NCO-containing component may be used. An excess of the polyfunctional component is not at all harmful inasmuch as this component, especially when it is one of the aforementioned hydroxy-acrylate compounds, constitutes a reactive diluent for the reaction product.

Where it is desired that the amide urethane acrylate compound be prepared with a molecular weight building polyol component, the polyol may be reacted with the polyisocyanate in the reaction vessel containing the organic acid and polyisocyanate components; or the reactions may be carried out in separate vessels, and then the NCO-terminated amide intermediate and the NCO-terminated polyol-residue urethane intermediate may be mixed together and further reacted with the polyfunctional compound. It is preferred that a blend of the organic acid component and the polyol component be added gradually to the polyisocyanate to form a mixture of amide NCO-terminated intermediate and polyol-residue urethane NCO-terminated intermediate.

It is usually desired that the total functional group equivalent weight contributed by the organic acid component and the polyol component be somewhat less than the equivalent weight of reactive isocyanato groups so as to provide NCO reaction sites for the polyfunctional compound.

The amide urethane acrylate compound may constitute the only major component of a coating composition or it may be used as an additive to coating compositions containing other radiation polymerizable components. Typical of these components are polyester, polyurethane and polyamide materials having ethylenically unsaturated groups capable of undergoing addition polymerization in the presence of actinic light or ionizing radiation.

Thus, the amide urethane acrylate may be present in coating compositions in an amount from about 0.1 percent to about 99 percent by weight of the total composition. More often the compound is present in a range of about 20 to 80 percent. A coating composition may contain the amide urethane acrylate compound alone in a diluent, although other components are usually present. The diluent may be of the volatile, non-reactive type like toluene, xylene or methylene chloride, but is preferred to be of the substantially non-volatile, reactive type such as the classes of compounds of monoacrylate and methacrylate esters, diacrylates, acrylamides and heterocyclic vinyl compounds such as N-vinyl pyrrolidone. When the reaction product and a reactive diluent make up the composition, the diluent is usually present in an amount in the range of about 10 to 60 total weight percent of the composition, and preferably in the range of about 10 to 20 weight percent.

Examples of preferred radiation polymerizable components which may serve as coreactive diluents are mono- and polyacrylic functional monomers such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, neopentylglycol diacrylate, ethyleneglycol diacrylate, diethyleneglycol diacrylate, triethyleneglycol diacrylate and tetraethyleneglycol diacrylate.

When the coating composition is to be cured by exposure to ultraviolet light, photoinitiator, photosensitizer or a mixture of photoinitiator and photosensitizer is usually present.

Photoinitiators are compounds which absorb photons and thereby obtain energy to form radical pairs, at least one of which is available to initiate addition polymerization of acrylic or methacrylic groups in the wellknown manner. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator. Examples of photoinitiators are benzoin, methyl benzoin ether, butyl benzoin ether, isobutyl benzoin ether, $\alpha,\alpha$-diethoxyacetophenone and $\alpha$-chloroacetophenone. Examples of photosensitizers are benzil, 1-naphthaldehyde, anthraquinone, benzophenone, 3-methoxybenzophenone, benzaldehyde, diethoxyacetophenone and anthrone.

The amount of photoinitiator, photosensitizer or mixture of photoinitiator and photosensitizer present in the radiation curable coating composition can vary widely. When any of these materials are present, the amount is usually in the range of from about 0.01 to about 10 percent by weight of the radiation curable components of the coating composition. Most often the amount is in the range of from about 0.1 to about 5 percent by weight. When the coating is to be cured by exposure to ionizing radiation, these materials are usually omitted from the coating composition, although their presence is permissible.

While the preferred method for effecting addition polymerization of the film-forming compounds of the invention is by subjecting the compound to an effective dose of ionizing or actinic radiation, other means and methods may be employed to obtain the desired cross-linked film. For example, addition polymerization may be accomplished by the presence of thermally-sensitive catalysts or initiators which are capable of generating free radicals that may initiate addition polymerization of the amide urethane acrylate compound of the invention. Typical initiators include benzoyl peroxide and azo bis(isobutyronitrile).

Extender pigments may be present in the composition, and when ultraviolet light is used to cure the film, it is preferred that the extender pigment be substantially transparent to ultraviolet light. Examples of ultraviolet light transparent extender pigments are silica, calcium carbonate, barium sulfate, talc, aluminum silicates, sodium aluminum silicates and potassium aluminum silicates.

Hiding and/or coloring pigment may optionally be present. When the pigment is of the ultraviolet light absorbing type and the coating composition is to be cured by exposure to ultraviolet light, the pigment should be used in amounts which do not preclude curing of the interior of the coating. Examples of hiding pigments are titanium dioxide, antimony oxide, zirconium oxide, zinc sulfide and lithopone. Examples of coloring pigments are iron oxides, cadmium sulfide, carbon black, phthalocyanine blue, phthalocyanine green, indanthrone blue, ultramarine blue, chromium oxide, burnt umber, benzidine yellow, toluidine red and aluminum powder. Individual pigments or mixtures of hiding and/or coloring pigments may be used.

Mixtures of extender pigments, hiding pigments and/or coloring pigments may also be employed.

Dyes in their customarily used amounts may be present in the coating composition.

Although not ordinarily desired, minor amounts, usually in the range of from about 0.1 to about 20 percent by weight of the total weight of the composition of volatile reactive solvent and/or inert volatile organic solvent may be present in the radiation curable coating composition.

Various additional materials may be added to adjust the viscosity of the coating composition. Examples of such materials are fumed silica, castor oil based compositions (e.g., Thixatrol ST, Baker Castor Oil Company), modified clays, 12-hydroxystearic acid, tetrabutyl orthotitanate and microcrystalline cellulose. When used, these materials are usually present in an amount in the range of from about 0.5 percent to about 15 percent by weight of the radiation curable components.

The radiation curable coating compositions of the invention are usually prepared by simply admixing a solution of the amide urethane acrylate compound dissolved in reactive solvent with such other ingredients as may be present. Although mixing is usually accomplished at room temperature, elevated temperatures are sometimes used. The maximum temperature which is usable depends upon the heat stability of the ingredients. Temperatures above about 120° C. are only rarely employed.

The radiation curable coating compositions are used to form cured adherent coatings on substrates. The substrate is coated with the coating composition using substantially any technique known to the art. These include spraying, curtain coating, dipping, direct roll coating, reverse roll coating, painting, brushing, printing, drawing and extrusion. The coated substrate is then exposed to radiation of sufficient intensity for a time sufficient to crosslink the coating. The times of exposure to radiation and the intensity of the radiation to which the coating composition is exposed may vary greatly. Generally, the exposure to radiation should continue until the C-stage is reached when hard, solvent resistant films result. In certain applications, however, it may be desirable for the curing to continue only until the B-stage, viz., gel stage, has been obtained.

Substrates which may be coated with the compositions of this invention may vary widely in their properties. Organic substrates such as wood, fiberboard, particle board, composition board, paper, paper board, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys. Especially suitable substrates are vinyl overlay coverings which are typically bonded to furniture and other articles. The amide urethane acrylate compositions are particularly useful for coating floor coverings such as tile, asbestos-tile, or linoleum-like coverings, and such flexible substrates as wall-base coving. These substrates are made from or comprise vinyl-containing polymerizable compositions such as vinyl chloride, vinyl acetate, vinyl fluoride, vinylidene chloride and copolymerizable combinations of said vinyl-containing compounds with ethylene or propylene.

Cured coatings of the radiation curable coating composition usually have thicknesses in the range of from about 0.001 millimeter to about 3 millimeters. More often they have thicknesses in the range of from about 0.002 millimeter to about 0.3 millimeter, and most preferred are coatings ranging from 0.002 millimeter to 0.08 millimeter. When the radiation curable coating composition is a radiation curable printing ink, the cured coatings usually have thicknesses in the range of from about 0.001 millimeter to about 0.03 millimeter.

The coatings of this invention may be cured by exposure to ionizing radiation, the unit of dose of ionizing radiation being the "rad" which is equal to 100 ergs of energy absorbed from ionizing radiation per gram of material being irradiated. As used throughout the specification, dose is referenced to the bleaching of calibrated blue cellophane film irrespective of the identity of the coating composition being irradiated.

The coatings of the invention may also be cured by exposure to actinic light. Actinic light, as used herein, is electromagnetic radiation having a wavelength of 700 nanometers or less which is capable of producing, either directly or indirectly, free radicals capable of initiating addition polymerization of the coating compositions of the invention. Usually photoinitiator, photosensitizer or mixtures of photoinitiator and photosensitizer are present to absorb photons and produce the free radicals, although in some cases, these materials are not needed. Actinic light possesses insufficient energy to produce ions in a medium composed of common elements such as air or water and hence, has an energy below about 10 electron volts. The most commonly used form of actinic light is ultraviolet light, viz., electromagnetic radiation having a wavelength in the range of from about 180 nanometers to about 400 nanometers, although actinic light of greater or shorter wavelength may also be used effectively.

Any suitable source which emits ultraviolet light may be used in the practice of this invention. Suitable sources are set forth in U.S. Pat. No. 4,017,652 to G. W. Gruber.

The times of exposure to actinic light and the intensity of actinic light to which the coating composition is exposed may vary greatly. In keeping with the general principles heretofore set forth, the exposure to actinic light should usually continue until the C-stage is obtained. However, for certain applications, the exposure may be stopped when the B-stage has been achieved.

The following examples, setting forth specific reactant quantities and conditions, specify certain additives, such as catalysts, diluents and surfactants for preparation of the amide urethane acrylate compounds of the present invention. Unless otherwise indicated, all parts and percentages are by weight, and all viscosity values are from measurements from the Gardner-Holt viscosity scale. These embodiments are not to be construed, however, as limiting the invention since there are numerous variations and modifications possible.

EXAMPLE I

Into a reaction vessel equipped with an agitator, a heater, cooling means, a thermometer and refluxing apparatus, there are charged 219 parts adipic acid, 888 parts 1-isocyanatomethyl-5-isocyanato-1,3,3-trimethyl-cyclohexane (isophorone diisocyanate), 100 parts toluene, 2 parts dibutyltin dilaurate and about 0.1 part of a polysiloxane surface tension modifying agent (DC 200; Dow Corning Corp.). The reaction mixture is heated slowly to about 150° C. over a period of three hours. The temperature of the reaction mixture is maintained at about 155° C. for about one more hour. An acid value of a sample of the reaction mixture is measured as 36.0–42.0, expressed in milliequivalents of acid per gram of KOH, obtained by titrating a methanolic solution of 0.5 N KOH against a sample of the reaction mixture. The reaction mixture is then maintained at about 155° C. for two hours after which time an acid value of 36.0–42.0 is obtained for a sample of the mixture. Then 1 part triethylene diamine ("Dabco" catalyst; Air Products Chemical Div.) is added to the reaction mixture, with the temperature thereafter being maintained at about 155° C. for about 15 minutes. The reaction mixture is then cooled to about 90° C. in 25 minutes and 325 parts triethylene glycol diacrylate is added to the reaction mixture. The reaction mixture is allowed to cool. After standing overnight, the reaction mixture is then heated to about 50° C. and 6 parts di-t-butyl-p-cresol ("Ionol" inhibiting agent; Shell Oil Co.) is added to the reaction mixture. Then over a period of 37 minutes, 638 parts hydroxyethyl acrylate is added to the reaction mixture, the temperature of which is 65° C. at the end of the addition period. The temperature is then maintained at 65°–75° C. for about two more hours, after which time an acid value of 5.0 is obtained for the reaction mixture. The temperature is maintained at 70°–75° C. for 2½ hours more, after which time the mixture is cooled and placed in a storage container. A sample of the amide urethane acrylate reaction product diluted to 75 percent concentration in 2-ethoxyethanol is observed to have a viscosity of K−.

A coating composition is prepared by adding 1 part diethoxyacetophenone to 100 parts of the above amide urethane acrylate reaction product. Commercially available, industrial grade vinyl asbestos tiles coated with the composition are exposed to curing radiation from a bank of four 200-watt per inch mercury vapor lamps positioned about 3½ inches from a conveyor carrying the coated test panels under the lamps at 70 feet per minute. After one pass through the curing zone, the test panels are observed to have very hard film coatings having good stain resistance.

EXAMPLE II

Into a reaction vessel equipped as in Example I, there are charged 592 parts isophorone diisocyanate, 230 parts 1,12-dodecanedioic acid, 100 parts toluene and 1.6 parts dibutyltin dilaurate. The reaction mixture is heated to about 147° C. in two hours after which time an acid value of 40 is obtained on a sample by the procedure of Example I. The reaction mixture is maintained at a temperature of 147°–150° C. for 1¾ hours, after which time an acid value of 25 is obtained as measured before. The reaction mixture is cooled to about 100° C. in 15 minutes. Then a mixture of 4 parts di-t-butyl-p-cresol and 327 parts 2-ethylhexyl acrylate is added to the reaction mixture. The temperature of the reaction mixture is observed to decrease to 70° C. after ten minutes. Then over a period of 25 minutes, 387 parts hydroxyethyl acrylate is added gradually to the reaction mixture. The temperature of the reaction mixture is maintained for 65 minutes at 70°–75° C., after which time an infrared analysis on a sample indicates the presence of a significant amount of unreacted isocyanato group in the reaction mixture. The reaction mixture is maintained at a temperature of 70°–80° C. for one hour and 20 minutes, after which time an infrared analysis of a sample indicates the substantial absence of unreacted isocyanato group. A viscosity of Z4+ is obtained on an undiluted sample of the amide urethane acrylate reaction product.

A coating composition is prepared by adding two parts diethoxyacetophenone and two parts benzophenone to 100 parts of the above amide urethane acrylate reaction product. Aluminum test panels are coated with the composition using a No. 0.018 wire-wound draw down bar. The panels are exposed to curing radiation in air from a bank of two 200-watt per inch mercury vapor lamps positioned about 3½ inches from a conveyor carrying the coated test panels under the lamps at 100 feet per minute. After one pass through the curing zone, the test panels are observed to have hard, flexible and tack-free film coatings.

EXAMPLE III

Into a reaction vessel equipped as in Example I, there are charged 888 parts isophorone diisocyanate, 282 parts azelaic acid, 100 parts toluene, 2 parts dibutyltin dilaurate and about 0.1 part of a polysiloxane surface tension modifying agent (DC 200; Dow Corning Corp.). The reaction mixture is heated slowly to about 150° C. over a period of three hours. The temperature of the reaction mixture is maintained at about 150° C. for 40 minutes, after which time an acid value of 38 is obtained on a sample by the procedure of Example I. The mixture is cooled to about 70° C. over a period of 50 minutes. Then 0.1 part phenothiazine and 325 parts triethyleneglycol diacrylate are added to the reaction mixture. After a period of 35 minutes with the temperature of the reaction mixture at about 47° C., 6 parts di-t-butyl-p-cresol is added to the mixture. Then over a period of 30 minutes, 638 parts hydroxyethyl acrylate is added dropwise to the reaction mixture. The temperature of the mixture at the end of the addition period is observed to be about 70° C. Then the reaction mixture is maintained at 70°–75° C. for 30 minutes more, after which time the mixture is cooled. A sample of the amide urethane acrylate reaction product diluted to 75 percent concentration in 2-ethoxyethanol is observed to have a viscosity of H. A coating composition containing this amide urethane acrylate reaction product will form hard, flexible coatings when cured by procedures as set forth in Examples I and II.

EXAMPLE IV

Into a reaction vessel equipped as in Example I, there are charged 888 parts isophorone diisocyanate, 219 parts adipic acid, 2 parts dibutyltin dilaurate and about 0.1 part of a polysiloxane surface tension modifying agent (DC 200; Dow Corning Corp.). The reaction mixture is heated to about 150° C. in one hour after which time an acid value of 61.7 is obtained on a sample by the procedure of Example I. The temperature of the reaction mixture is maintained at about 150° C. for 70 minutes, after which time an acid value of 34 is obtained on a sample. The reaction mixture is cooled to about 105° C. in 20 minutes. Then over a period of 25 minutes, a blend of 373 parts 2-ethylhexyl acrylate and 373 parts ethoxyethoxyethyl acrylate is added to the reaction mixture. The temperature of the reaction mixture is observed to decrease to about 75° C. by the end of the addition period. After 15 minutes more, the temperature of the reaction mixture is observed to be about 47° C. Then over a period of two hours, a blend of 319 parts hydroxyethyl acrylate and 813 parts of a poly(oxybutylene glycol) having a molecular weight of about 650 ("Polymeg 650"; Quaker Oats Chemical Co.) is added to the reaction mixture. The temperature of the reaction mixture during the addition period is maintained at 47°–50° C. The reaction mixture is held for one hour and 15 minutes after which time the temperature is observed to be about 77° C. The mixture is then cooled. An infrared analysis on a sample of the reaction mixture indicates the presence of unreacted isocyanato group. After standing overnight, the reaction mixture is heated to about 80° C. and held for a period sufficient to provide reaction of residual isocyanato group as indicated by its substantial absence in an infrared analysis. An undiluted sample of the amide urethane acrylate reaction product is observed to have a viscosity of Z6+ and a sample diluted to 75 percent concentration in 2-ethoxyethanol has a viscosity of O−.

A coating composition is prepared by adding 1.1 parts diethoxyacetophenone and 1.5 parts benzophenone to 47.5 parts of the above amide urethane acrylate reaction product. Commercially available, industrial grade vinyl asbestos tiles are coated with the composition using a No. 0.042 wire-wound draw down bar. The panels are exposed to curing radiation in air from a bank of four 200-watt per inch mercury vapor lamps positioned about 3½ inches from a conveyor carrying the coated test panels under the lamps at 60 feet per minute. After two passes through the curing zone, the test panels are observed to have mar-resistant, flexible and tack-free film coatings.

Although specific examples of the instant invention have been set forth hereinabove, it is not intended that the invention be limited solely thereto, but is to include all the variations and modifications falling within the scope of the appended claims.

What is claimed is:
1. Addition polymerizable compound comprising the reaction product of
   (a) carboxylic acid containing at least one carboxyl functional group;
   (b) polyisocyanate; and
   (c) polyfunctional compound containing at least one hydroxyl group which is reactive with an isocyanato group of said polyisocyanate and which polyfunctional compound provides at least one ethylenic functional group in said reaction product; wherein said addition polymerizable compound contains
   (d) at least one amide group formed by reaction of a carboxyl group of said carboxylic acid with an isocyanato group of said polyisocyanate; and
   (e) at least one urethane group formed by reaction of a hydroxyl group of said polyfunctional compound with an isocyanate group of said polyisocyanate.

2. The addition polymerizable compound of claim 1 wherein said carboxylic acid is selected from the group consisting of saturated monocarboxylic acid, saturated polycarboxylic acid, unsaturated polycarboxylic acid and hydroxycarboxylic acid.

3. The addition polymerizable compound of claim 2 wherein said saturated monocarboxylic acid is selected from the group consisting of acetic acid, propionic acid, 2-ethylhexanoic acid and benzoic acid.

4. The addition polymerizable compound of claim 2 wherein said saturated polycarboxylic acid is selected from the group consisting of adipic acid, azelaic acid and dodecanedioic acid.

5. The addition polymerizable compound of claim 2 wherein said unsaturated polycarboxylic acid is selected from the group consisting of fumaric acid and itaconic acid.

6. The addition polymerizable compound of claim 2 wherein said hydroxy-carboxylic acid is hydroxyacetic acid, 2,2-bis(hydroxymethyl)propionic acid or an aromatic hydroxy acid prepared from the reaction of phthalic anhydride and diethylene glycol.

7. The addition polymerizable compound of claim 1 comprising the reaction product of said components and a polyol selected from the group consisting of polyester polyol, alkyl diol, alkyl triol and polyether polyol.

8. The addition polymerizable compound of claim 7 wherein said polyester polyol is a poly(caprolactone) polyol.

9. The addition polymerizable compound of claim 1 wherein said polyisocyanate is selected from the group consisting of 1-isocyanatomethyl-5-isocyanato-1,3,3-trimethylcyclohexane, toluene diisocyanate and bis(4-isocyanatocyclohexyl)methane.

10. The addition polymerizable compound of claim 1 wherein said polyfunctional compound is hydroxyl-containing acrylic ester.

11. The addition polymerizable compound of claim 10 wherein said hydroxyl-containing acrylic ester is selected from the group consisting of 2-hydroxyethyl acrylate, 2-hydroxypropyl acrylate, 2-hydroxyethyl methacrylate and 2-hydroxypropyl methacrylate.

12. A coating composition containing addition polymerizable compound as defined in claim 1.

13. An article of manufacture having a cured film thereon made from the coating composition of claim 12.

14. A method for preparing an addition polymerizable compound comprising reacting
   (a) carboxylic acid containing at least one carboxyl functional group;
   (b) polyisocyanate; and
   (c) polyfunctional compound containing at least one hydroxyl group which is reactive with an isocyanato group of said polyisocyanate and which polyfunctional compound provides at least one ethylenically unsaturated functional group in said addition polymerizable compound; wherein said addition polymerizable compound contains
   (d) at least one amide group formed by reaction of a carboxyl group of said carboxylic acid with an isocyanato group of said polyisocyanate; and
   (e) at least one urethane group formed by reaction of a hydroxyl group of said polyfunctional compound with an isocyanate group of said polyisocyanate.

15. The method of claim 14 wherein said addition polymerizable compound is made by
   (a) reacting said carboxylic acid with said polyisocyanate to form an NCO-terminated amide intermediate; and
   (b) reacting said polyfunctional compound with said NCO-terminated amide intermediate.

16. The method of claim 14 wherein said addition polymerizable compound is made by reacting together said components and a polyol selected from the group consisting of polyester polyol, alkyl diol, alkyl triol, polyether polyol and polyoxyalkylene polyol.

17. The method of claim 16 wherein said addition polymerizable compound is made by the steps of
   (a) adding a mixture of said carboxylic acid and said polyol to said polyisocyanate to form a blend comprising amide-containing NCO-terminated intermediate and urethane-containing NCO-terminated intermediate; and
   (b) adding said polyfunctional compound to said blend of NCO-terminated intermediates.

18. The method of claims 15 or 17 wherein
   (a) said carboxylic acid or said mixture is added gradually to said polyisocyanate; and
   (b) said polyfunctional compound is added gradually to said NCO-terminated intermediates.

19. The method of claim 16 wherein said polyester polyol is poly(oxybutylene glycol).

20. The method of claim 14 wherein said carboxylic acid is selected from the group consisting of saturated monocarboxylic acid, saturated polycarboxylic acid, unsaturated polycarboxylic acid and hydroxy-carboxylic acid.

21. The method of claim 20 wherein said saturated monocarboxylic acid is selected from the group consisting of acetic acid, propionic acid, 2-ethylhexanoic acid and benzoic acid.

22. The method of claim 20 wherein said saturated polycarboxylic acid is selected from the group consisting of adipic acid, azelaic acid and dodecanedioic acid.

23. The method of claim 20 wherein said unsaturated polycarboxylic acid is selected from the group consisting of fumaric acid and itaconic acid.

24. The method of claim 20 wherein said hydroxy-carboxylic acid is hydroxyacetic acid, 2,2-bis(hydroxymethyl)propionic acid or an aromatic hydroxy acid prepared from the reaction of phthalic anhydride and diethylene glycol.

25. The method of claim 14 wherein said polyisocyanate is selected from the group consisting of 1-isocyanatomethyl-5-isocyanato-1,3,3-trimethylcyclohexane, toluene diisocyanate and bis(4-isocyanatocyclohexyl)methane.

26. The method of claim 14 wherein said polyfunctional compound is hydroxy-containing acrylic ester.

27. The method of claim 26 wherein said hydroxy-containing acrylic ester is selected from the group consisting of 2-hydroxyethyl acrylate, 2-hydroxypropyl acrylate, 2-hydroxyethyl methacrylate and 2-hydroxypropyl methacrylate.

* * * * *